(12) United States Patent
Chang et al.

(10) Patent No.: US 8,368,688 B2
(45) Date of Patent: Feb. 5, 2013

(54) METHOD FOR RENDERING FLUID

(75) Inventors: Hsiang-Yun Chang, Taoyuan County (TW); Chun-Fa Chang, Taipei (TW); Li-Cheng Chen, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 1162 days.

(21) Appl. No.: 12/286,793

(22) Filed: Oct. 1, 2008

(65) Prior Publication Data

US 2009/0267951 A1    Oct. 29, 2009

(30) Foreign Application Priority Data

Apr. 28, 2008 (TW) ............................... 97115577 A

(51) Int. Cl.
G06T 15/00 (2006.01)
(52) U.S. Cl. ........................ 345/419; 345/474
(58) Field of Classification Search .................. None
See application file for complete search history.

(56) References Cited

U.S. PATENT DOCUMENTS

| 5,537,641 | A | 7/1996 | da Vitoria Lobo et al. | |
|---|---|---|---|---|
| 6,856,319 | B2 | 2/2005 | Rose, III et al. | |
| 6,985,148 | B2 | 1/2006 | Liang et al. | |
| 7,050,058 | B2 | 5/2006 | Liang et al. | |
| 7,580,821 | B2 * | 8/2009 | Schirm et al. | 703/9 |
| 7,983,884 | B2 * | 7/2011 | Anderson | 703/9 |

OTHER PUBLICATIONS

Takahashi et al. "Realistic Animation of Fluid with Splash and Foam," Nov. 2003, Computer Graphics Forum, vol. 22, Issue 3, p. 396.*
Yu et al. "A New Water Droplet Model Using Metaball in the Gravitational Field," Apr. 1999, Graphics Application Library, vol. 23, Issue 2, pp. 212-220.*
Bohm et al. "From Point Samples to Surfaces—On Meshing and Alternatives," Sep. 2006, IAPRS vol. 36, Part 5, p. 53.*
Kipfer et al. "Realistic and Interactive Simulation of Rivers," Jun. 2006, Proceeding GI '06 Proceedings of Graphics Interface, p. 45.*
"Office Action of Taiwan Counterpart Application", issued on Oct. 27, 2011, p. 1-p. 4.
Chang et al., "Real-time Rendering of Splashing Stream Water", IIH-MSP '07 Proceedings of the Third International Conference on International Information Hiding and Multimedia Signal Processing (IIH-MSP 2007)—vol. 01, Oct. 30, 2007, pp. 337-340.

* cited by examiner

Primary Examiner — Ulka Chauhan
Assistant Examiner — Andrew G Yang
(74) Attorney, Agent, or Firm — J.C. Patents

(57) ABSTRACT

A method for rendering fluid is provided. First, state information of a plurality of fluid particles is provided, wherein the state information records whether the fluid particles are located above or under a fluid surface and the interactions between the fluid particles and a terrain or the dynamic objects. Then, whether to render the fluid particles in a direction facing a viewer or in a direction parallel to the flow direction is determined according to the information that whether the fluid particles are located above or under the fluid surface. Next, the fluid particles are rendered as a plurality of two-dimensional metaballs according to the interactions between the fluid particles and the terrain or the dynamic objects, and these metaballs are stacked to reconstruct the fluid.

14 Claims, 6 Drawing Sheets

METHOD FOR RENDERING FLUID

CROSS-REFERENCE TO RELATED APPLICATION

This application claims the priority benefit of Taiwan application serial no. 97115577, filed on Apr. 28, 2008. The entirety of the above-mentioned patent application is hereby incorporated by reference herein and made a part of specification.

BACKGROUND OF THE INVENTION

1. Field of the Invention

The present invention generally relates to a graphics rendering method, and in particular, to a fluid rendering method.

2. Description of Related Art

Due to the huge quantity of calculations to be carried out, an existing technique for rendering fluid and the interaction between fluid and terrain or dynamic objects (dynamic obstacles) usually requires a lot of calculations and very high production cost in order to achieve a good simulation effect. In particular, as to a technique which needs to simulate and render graphics in real-time, the interaction between the fluid and the terrain is usually ignored, and accordingly the quality of the visual effect is sacrificed, in order to render the graphics within a limited time.

According to an existing method for rendering fluid, a smoothed particle hydrodynamics (SPH) model is usually adopted and a mesh is carpeted on the fluid particles so that the fluid can be simulated with less fluid particles and accordingly a better performance can be achieved. However, by using the method described above, the splashed water drops, the splatting, or rapid current caused by collisions between the fluid and dynamic obstacles or the terrain cannot be presented. Thereby, the fluid simulated does not look realistic enough.

According to another existing method, a water column model is adopted for constructing fluid, wherein the heights of water is considered as water columns, each of which has a plurality of pipelines, so that the fluid is simulated as flowing along the direction of the pipelines. However, such a method can only be applied to the rendering of calm and slow fluid but still cannot actually simulate aforementioned splash effects such as water drops, splatting, or rapid current.

SUMMARY OF THE INVENTION

Accordingly, the present invention is directed to a fluid rendering method, wherein fluid particles are rendered as two-dimensional metaballs according to state information such as the positions of the fluid particles and the interactions between the fluid particles and a terrain or a dynamic objects such that a splash effect of the fluid can be simulated.

The present invention provides a fluid rendering method including following steps. First, state information of a plurality of fluid particles is provided, wherein the state information records whether the fluid particles are located above or under a fluid surface and the interactions between the fluid particles and a terrain or a plurality of dynamic objects. Then, whether to render the fluid particles in a direction facing a viewer or in a direction parallel to the flow direction is determined according to the information that whether the fluid particles are located above or under the fluid surface. Next, the fluid particles are rendered as a plurality of two-dimensional metaballs, according to the interactions between the fluid particles and the terrain or the dynamic objects, and the metaballs are stacked to reconstruct the fluid.

According to an embodiment of the present invention, the step of providing the state information of the fluid particles further includes following steps. First, a height field of the terrain and the dynamic objects in the region that the fluid particles are existence is rendered. Then, a gradient value at each position in the terrain is calculated by using the height field and served as the flow direction of the fluid particles along the terrain and the dynamic objects, and these gradient values are recorded as a gradient field. Next, a predetermined velocity field is added to the gradient field to obtain a-flow field of the fluid particles. Finally, a state transition situation when the fluid particles interact with the terrain and the dynamic objects is determined by using a finite state machine according to state information of the fluid particles and the previously obtained information of the height field and the flow field, and the state transition situation is recorded as the state information of the fluid particles.

According to an embodiment of the present invention, the step of providing the state information of the fluid particles further includes storing the state information, the height field, the gradient field, and the flow field as textures to be accessed by a graphic processing unit (GPU).

According to an embodiment of the present invention, the state information contains the data of position, velocity, state, and transition of the fluid particles.

According to an embodiment of the present invention, the fluid rendering method further includes performing a Gaussian blur process to the gradient field after the step of calculating the gradient field of the terrain or the dynamic objects by using the height field.

According to an embodiment of the present invention, the fluid rendering method further includes deleting the gradient values lower than a threshold in the processed gradient field after the step of performing the Gaussian blur process to the gradient field.

According to an embodiment of the present invention, the fluid rendering method further includes rendering a lighting effect of the fluid according to the relationship between the positions of the fluid particles and the gradient field, wherein the lighting effect includes the fluid reflection, refraction, and Fresnel effect.

According to an embodiment of the present invention, the step of rendering the height field of the terrain and the dynamic objects in the region that the fluid particles are existence includes rendering the height field using a perpendicular angle to the ground, wherein the pixel value at each position in the height field is corresponding to the height of the terrain and the dynamic objects, and the terrain includes the earth surface or the surface of a river.

According to an embodiment of the present invention, the state transition situation includes that whether the fluid particles are located above or under the fluid surface, collisions between the fluid particles and the terrain or the dynamic objects, and the situation that the fluid particles are broken into a plurality of sub-fluid particles due to the collisions.

According to an embodiment of the present invention, wherein the fluid particles are rendered in the direction facing the viewer when the fluid particles are located above the fluid surface, and the fluid particles are rendered in the direction parallel to the flow direction when the fluid particles are located under the fluid surface.

According to an embodiment of the present invention, the fluid particles are rendered as the two-dimensional metaballs through a point splatting method.

According to an embodiment of the present invention, the step of rendering the fluid particles as the metaballs includes rendering the metaballs with multilayer textures so as to simulate the thickness and depth of the fluid.

According to an embodiment of the present invention, the fluid rendering method further includes adding a background to a back layer of the rendered fluid particles.

In the present invention, a height field is adopted for representing a terrain and dynamic objects in the region through which the fluid flows, the approximate direction along which the fluid particles flow is then obtained by calculating the gradient of the height field, and collisions between the fluid particles and the terrain or the dynamic objects are detected, so as to generate visual effects such as splashes and foams. Moreover, in the present invention, the mergence and separation of water drops are simulated by using two-dimensional metaballs and the thickness and depth of the fluid are simulated with multilayer textures, so that the visual effect of realistic fluid can be achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
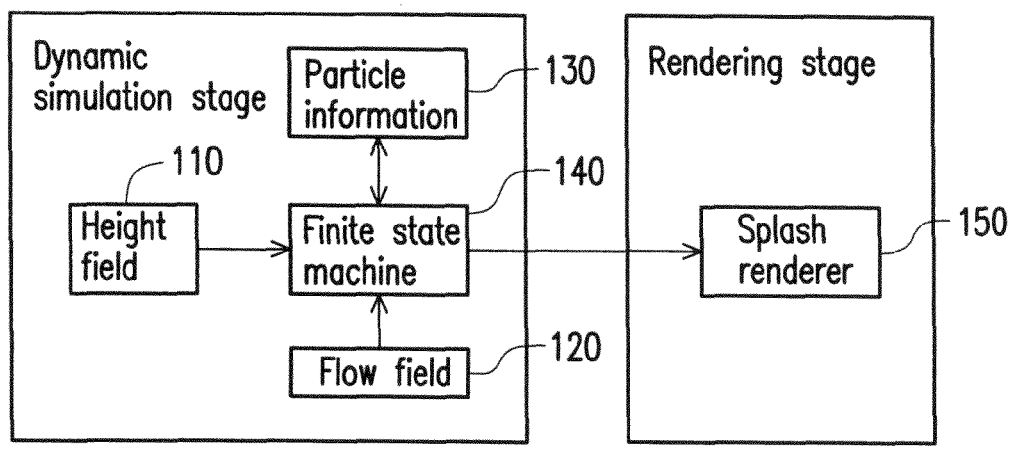
FIG. 1 is a schematic block diagram illustrating a fluid rendering method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, different visual effects such as rapid current and splashes or foams generated by collisions between a fluid and a terrain or dynamic objects are correctly and quickly simulated based on physical principles and the interactions between the fluid and the irregular terrain or dynamic objects. Accordingly, the present invention provides a fluid rendering method based on foregoing concept. Embodiments of the present invention will be described below with reference to accompanying drawings. It should be noted herein that the dynamic objects as described above and hereinafter are defined as the obstacles that may interact with the fluid particles in the flow path of the fluid.

FIG. 1 is a schematic block diagram illustrating a fluid rendering method according to an embodiment of the present invention. Referring to FIG. 1, in the present embodiment, the interaction between a fluid and a terrain or dynamic objects is simulated by using a large-scale particle system, and the simulation procedure can be divided into a dynamic simulation stage and a rendering stage. According to the present embodiment, during the dynamic simulation stage, a height field 110 is adopted for representing the terrain and the dynamic objects, and the flow direction of the fluid particles along the terrain or the dynamic objects is predicted by calculating a gradient value at each position in the height field 110. Accordingly, a flow field 120 for representing the flow direction of the fluid particles is obtained. Besides, in the present embodiment, state information 130 containing position, velocity, state, and transition of the fluid particles is also provided such that a finite state machine 140 can detect collisions of the fluid particles and accordingly generate different visual effects, such as splashes and foams of the fluid.

According to the present embodiment, during the rendering stage, metaballs are rendered through a point splatting technique by using a splash renderer 150, so as to simulate the visual effects of mergence and separation of water drops. Besides, in the present embodiment, the thickness and depth of the fluid are simulated with multilayer textures, and a lighting effect is added to increase the realistic lighting reflection effect. Another embodiment of the present invention regarding the fluid rendering stage will be described below.

Figure 2:
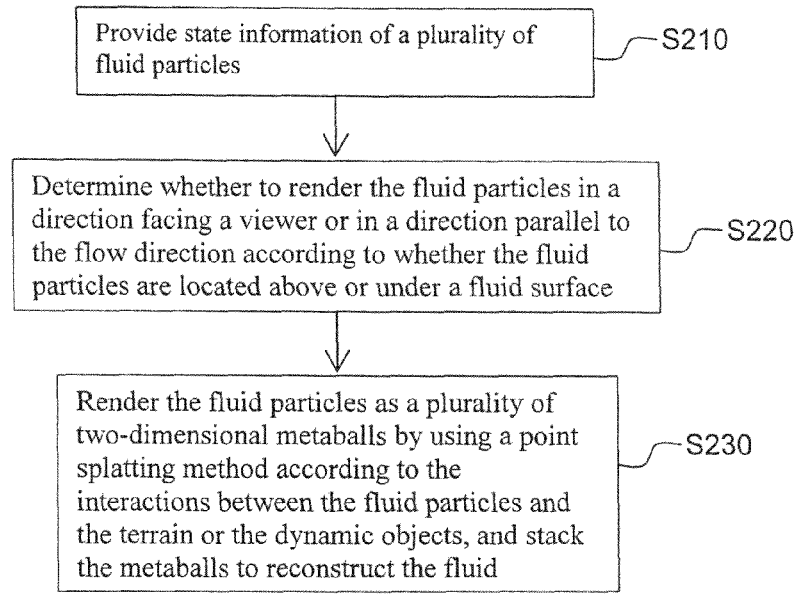
FIG. 2 is a flowchart illustrating a fluid rendering method according to an embodiment of the present invention.

FIG. 2 is a flowchart illustrating a fluid rendering method according to an embodiment of the present invention. Referring to FIG. 2, in the present embodiment, the fluid particles are rendered according to the positions of the fluid particles and the interactions between the fluid particles and a terrain or dynamic objects, so as to simulate the fluid and the splash effect of water drops. This method will be described in detail below.

First, state information of a plurality of fluid particles is provided (step S210). The state information records whether the fluid particles are located above or under a fluid surface (i.e. the relationship between the fluid particles and the fluid surface) and the interactions between the fluid particles and the terrain or the dynamic objects. The state information may be a texture constructed by a central processing unit (CPU) of a computer according to the terrain or the dynamic objects and stored in a storage medium such as a memory to be accessed by a graphic processing unit (GPU) in a display card so as to increase the speed of graphic processing. The method for obtaining the state information is described below.

Figure 3:
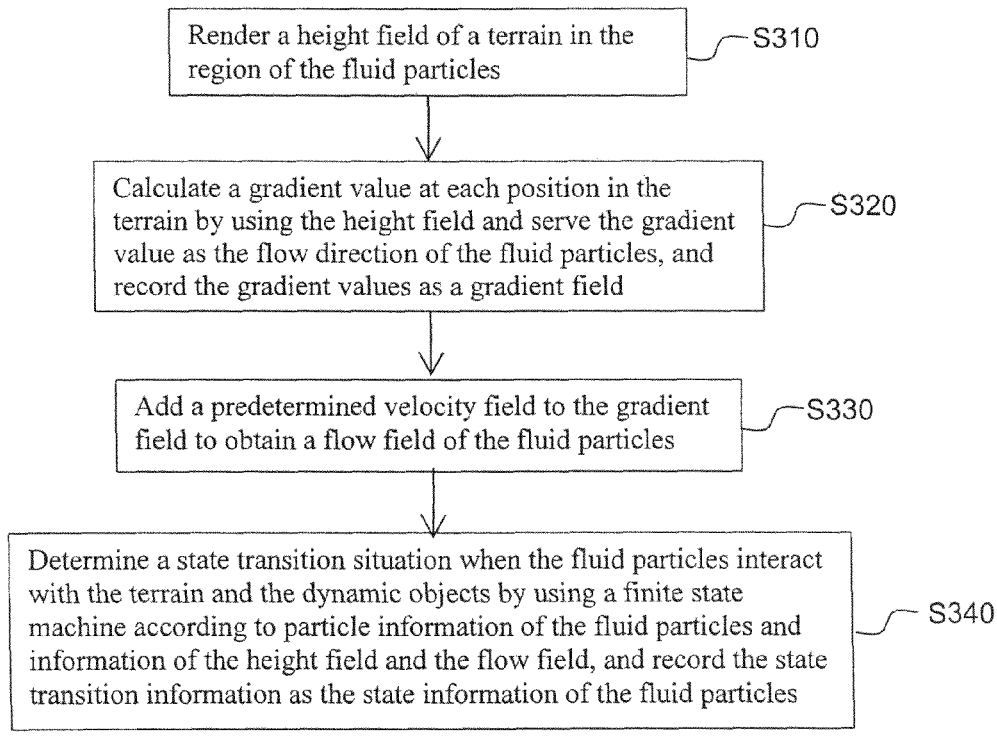
FIG. 3 is a flowchart illustrating a method for constructing a state information of fluid particles according to an embodiment of the present invention.
Figure 4:
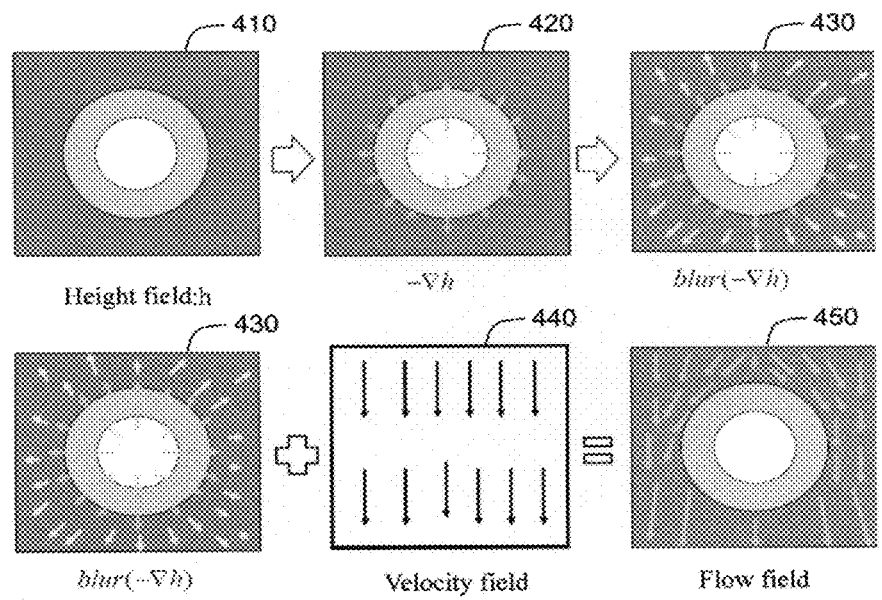
FIG. 4 is a schematic diagram illustrating a method for constructing scene information according to an embodiment of the present invention.

FIG. 3 is a flowchart illustrating a method for constructing state information of fluid particles according to an embodiment of the present invention, and FIG. 4 is a schematic diagram illustrating a method for constructing scene information according to an embodiment of the present invention.

Referring to both FIG. 3 and FIG. 4, in the present embodiment, first, a height field (as the height field 410 in FIG. 4) that is a terrain in the region of the fluid particles is rendered (step S310). The height field is rendered using a perpendicular angle to the ground, and different objects are presented with different colors of height field texture. The pixel values of these textures are corresponding to the height of the terrain, and accordingly the earth surface, the fluid surface, and the dynamic objects can be presented all together through this height field.

Figure 5:
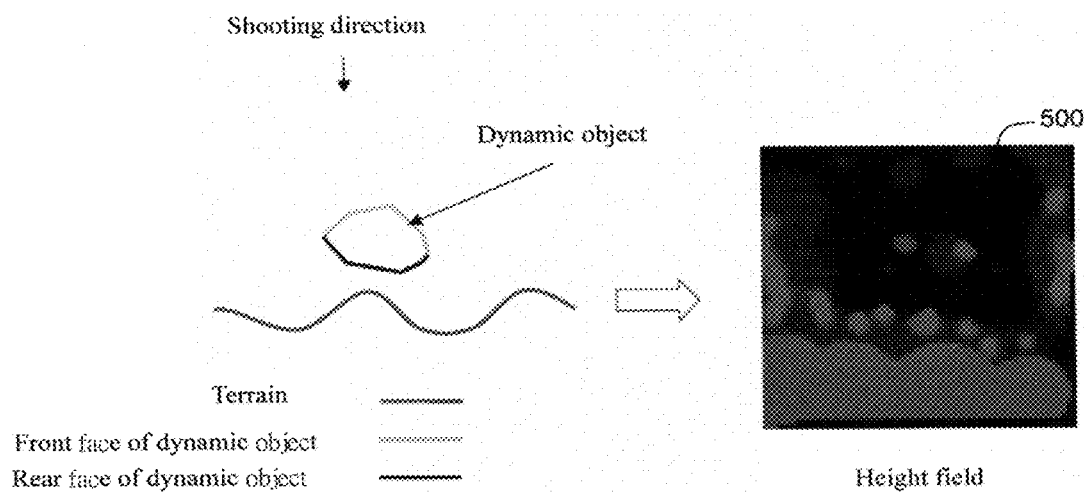
FIG. 5 illustrates an example that creating a height field according to an embodiment of the present invention.

FIG. 5 illustrates an example of creating a flow field according to an embodiment of the present invention. Referring to FIG. 5, in the present embodiment, a red channel of height field texture is used for representing the terrain, a green channel of height field texture is used for representing a front face (directly facing the shooting direction) of the dynamic object, a blue channel of height field texture is used for representing a back (opposite to the shooting direction) of the dynamic object, and an alpha channel of height field texture is used for representing the fluid surface. Besides, in the present embodiment, different shades (i.e. pixel values) in each pixel are further used for representing different heights in different dynamic objects or terrain. Thereby, a height field 500 is rendered based on foregoing principles. It should be noted that the colors used in the height field 500 are only for describing the present embodiment but not for limiting the scope of the present invention.

Since the flowing speed and direction of the fluid are both controlled by the terrain or the dynamic objects, in the present embodiment, a gradient value at each position in the height field is further calculated after the height field is obtained, and these gradient values are served as the flow direction of the fluid particles along the terrain and the dynamic objects. These gradient values are recorded as a gradient field (as the gradient field 420 in FIG. 4) (step S320). The gradient field represents the gradient at each position in the terrain and the dynamic objects in the region of the fluid particles.

It should be noted that in order to make the distribution of the gradient values more smooth, in the present embodiment, a Gaussian blur process is further performed to the gradient field, and a predetermined velocity field (as the velocity field 440 in FIG. 4) is added to the processed gradient field (as the gradient field 430 in FIG. 4) so as to obtain a flow field (as the flow field 450 in FIG. 4) for representing the flow direction of the fluid particles (step S330).

Finally, whether the state of the fluid particles is changed is determined by using a finite state machine according to state information such as the position, velocity, state, and transition of the fluid particles and the information of the height field and the flow field, and a state transition situation when the fluid particles interact with the terrain and the dynamic objects is determined and recorded as the state information (step S340). The state transition situation contains whether the fluid particles are located above or under the fluid surface, collisions between the fluid particles and the terrain and the dynamic objects, and the situation that the fluid particles are broken into a plurality of sub-fluid particles due to the collisions. It should be mentioned herein that the state information, the height field, the gradient field, and the flow field are respectively stored as a texture to be accessed by the GPU.

Referring to FIG. 2 again, after the state information of the fluid particles is obtained through foregoing method, whether to render the fluid particles in a direction facing a viewer or in a direction parallel to the flow direction is then determined according to the information that whether the fluid particles are located above or under the fluid surface recorded in the state information (step S220). To be specific, in the present embodiment, the fluid particles are rendered by using a billboard method, and the rendered direction thereof is determined by the relative positions of the fluid particles and the fluid surface. The fluid particles are rendered in the direction facing the viewer when the fluid particles are located above the fluid surface, and the fluid particles are rendered in the direction parallel to the flow direction when the fluid particles are located under the fluid surface.

On the other hand, in the present embodiment, the fluid particles are further rendered as a plurality of two-dimensional metaballs through a point splatting method according to the interactions between the fluid particles and the terrain or the dynamic objects, and these metaballs are stacked so as to reconstruct the fluid (step S230). In the present embodiment, the metaballs are rendered with multilayer textures in order to simulate the thickness and depth of the fluid. After the metaballs are rendered, they are further filtered (for example, by comparing the size of each meatball with a threshold and deleting those metaballs having the sizes lower than the threshold) to remove those unobvious fluid particles.

It should be mentioned herein that in the present embodiment, a lighting effect of the fluid particles is further rendered according to the relationship between the positions of the fluid particles and the gradient field so that the rendered fluid can present different lighting effects along with the changes of its position and angle and accordingly can be more realistic. The lighting effect includes the reflection, refraction, and Fresnel effect. Besides, a background may be further added to a back layer of the rendered fluid so as to reconstruct the original scene.

Different rendering stages in the fluid rendering method provided by the present invention will be described based on foregoing fluid rendering concepts with reference to actual graphics, so that a complete fluid rendering procedure can be presented.

Figure 6:
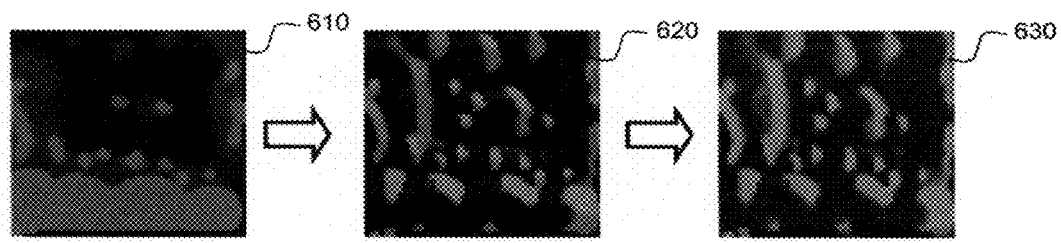
FIG. 6 illustrates an example of creating a flow field according to an embodiment of the present invention.

FIG. 6 illustrates an example of a fluid rendering method according to an embodiment of the present invention. Referring to FIG. 6, the height field 610 is rendered using a perpendicular angle perpendicular to the ground, and different colors of height field texture are used for representing different objects, such as the earth surface, the fluid surface, and the dynamic objects. Next, the gradient values in the height field are calculated and a Gaussian blur process is performed to the height field, so as to obtain a gradient field 620. Finally, a predetermined velocity field is added to the gradient field 620 so as to obtain a flow field 630 for representing the flow direction of the fluid particles.

Figure 7:
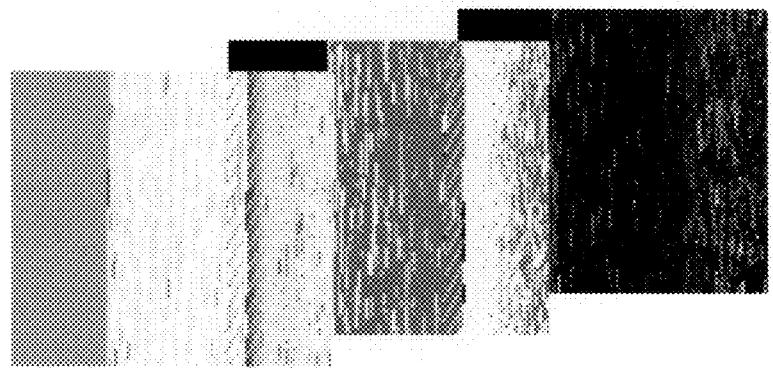
FIG. 7 illustrates an example of the textures of state information of fluid particles according to an embodiment of the present invention.
Figure 8:
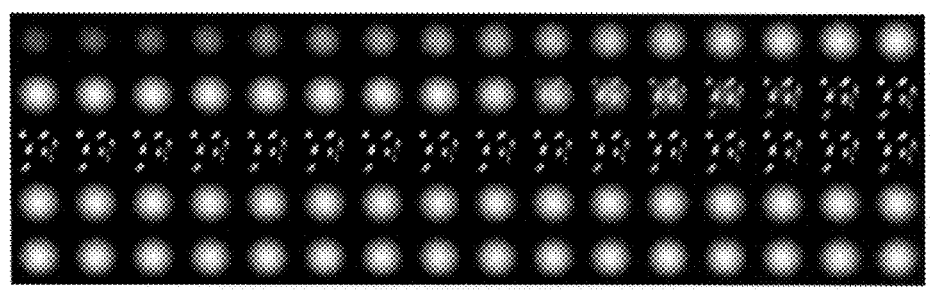
FIG. 8 illustrates an example of the appearances of fluid particles in different states according to an embodiment of the present invention.

FIG. 7 illustrates an example of the textures of state information of fluid particles according to an embodiment of the present invention. After the height field 610 and the flow field 630 are obtained, whether the state of the fluid particles is changed is then determined by using a finite state machine according to the textures of the state information illustrated in FIG. 7 and the appearances of the fluid particles illustrated in FIG. 8, wherein each icon in FIG. 8 represents the appearance (height field of a particle) of the fluid particles in different states, and in the present invention, a corresponding appearance of the fluid particles in FIG. 8 is selected according to different states thereof and then the fluid particles are rendered by using a billboard method.

Figure 9:
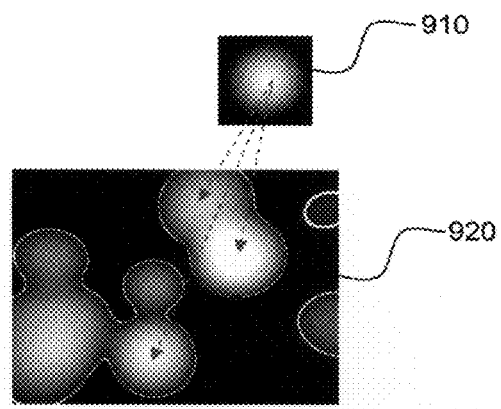
FIG. 9 illustrates an example showing how to render fluid particles as two-dimensional metaballs according to an embodiment of the present invention.
Figure 10:
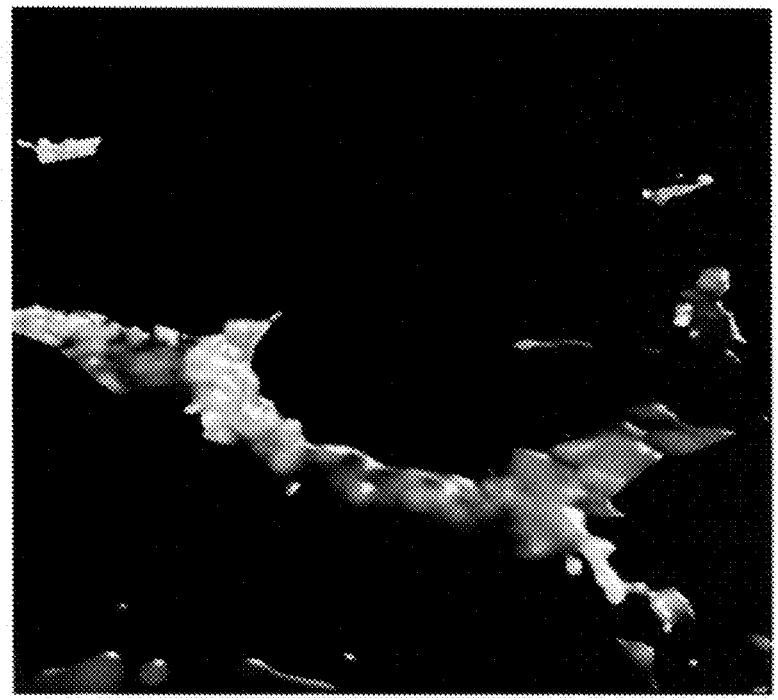
FIG. 10 illustrates an example of the visual effect of mergence and separation of water drops according to an embodiment of the present invention.

FIG. 9 illustrates an example showing how to render fluid particles as two-dimensional metaballs according to an embodiment of the present invention. Referring to FIG. 9, according to the present invention, a corresponding appearance (for example, the fluid particle graphics 910) of the fluid particles in FIG. 8 is selected according to the interactions between the fluid particles and the terrain or the dynamic objects. Then, the fluid particles are rendered as a plurality of two-dimensional metaballs through a point splatting method. Finally, the metaballs are stacked to reconstruct the fluid graphics 920. By rendering the metaballs with multilayer textures, the thickness and depth of the fluid can be represented and the visual effects such as mergence and separation of water drops as shown in FIG. 10 can be simulated.

Figure 11:
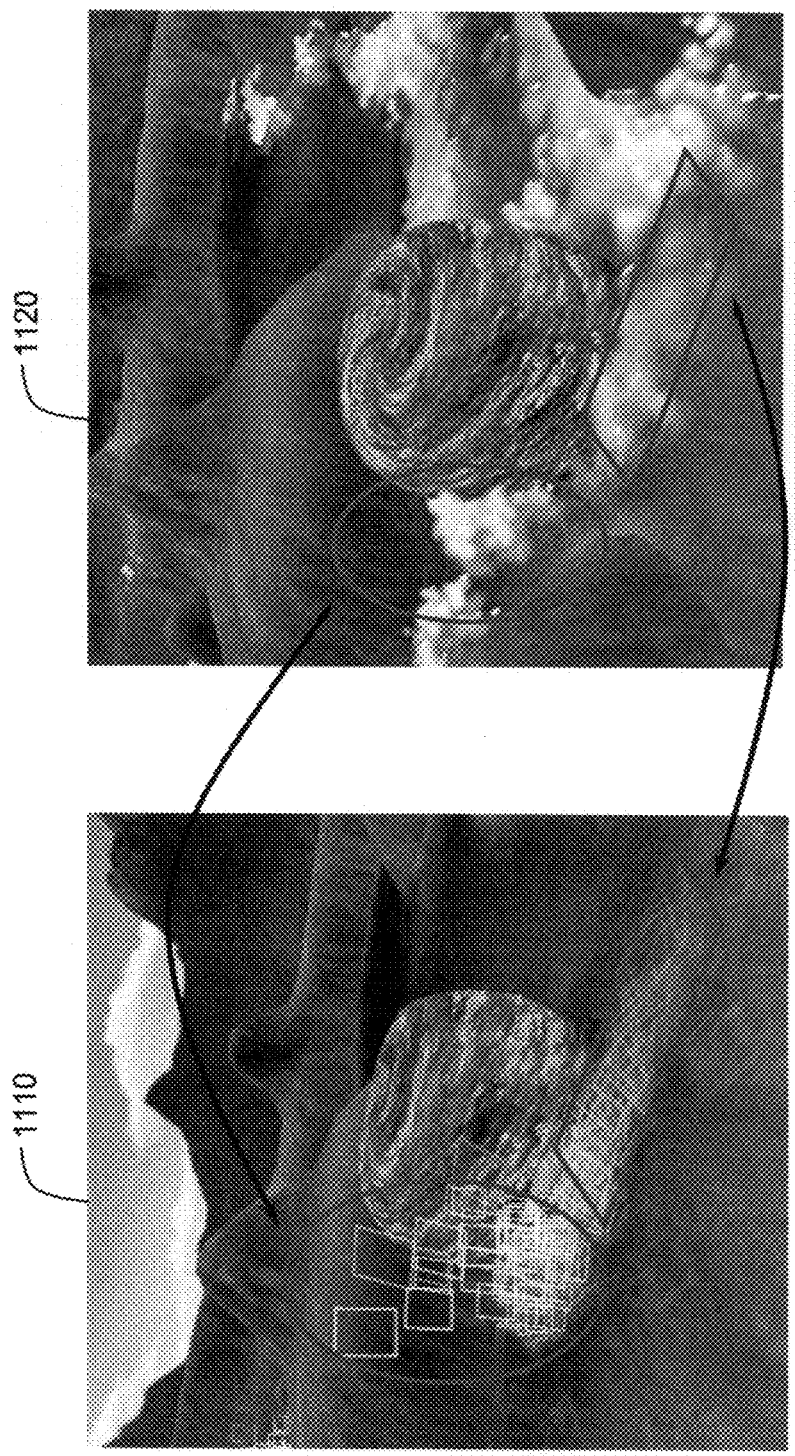
FIG. 11 illustrates an example of a fluid rendering result using billboard method based on a viewing direction according to an embodiment of the present invention.

On the other hand, in the present invention, the fluid is also rendered in a direction facing the viewer or parallel to the flow direction according to the state of the fluid particles. FIG. 11 illustrates an example of a fluid rendering result using billboard method based on a viewing direction according to an embodiment of the present invention. Referring to FIG. 11, the frames in the fluid graphics 1110 represent the rendering planes of the fluid particles, and the directions of the normal vectors of the rendering planes are determined according to the state of the fluid particles. To be specific, the normal vector of each rendering plane in the fluid graphics 1110 may be facing the viewer or parallel to the flow direction, and the actually rendered fluid graphics 1120 is also rendered in a direction facing the viewer or parallel to the fluid direction. When the fluid particles are located above the fluid surface, the fluid particles are rendered in the direction facing the viewer in order to achieve the visual effects such as splashes or foams. On the other hand, when the fluid particles are located under the fluid surface, the fluid particles are rendered in the direction parallel to the flow direction in order to achieve the visual effect of the fluid itself. Finally, the interactive fluid effect can be rendered by combining the visual effects of the fluid body and the splashes or foams so that an image close to the real fluid can be reconstructed.

As described above, in the present invention, the interactions between the fluid particles and the terrain or the dynamic objects is considered so that rapid current and splashes of the fluid can be simulated and rendered in real time. Moreover, by reconstructing a fluid by stacking two-dimensional metaballs, the visual effects of rapid current and flashes or foams generated by collisions between the fluid and the terrain or any obstacle can be simulated so that the conventional problem of low performance at rendering three-dimensional metaballs can be resolved. Thereby, fluid graphics can be simulated and rendered in real time without sacrificing the quality of visual effect, and the technique disclosed in the present invention can be applied to those techniques which need to render graphics in real time, such as animations or games.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fluid rendering method, comprising:
providing state information of a plurality of fluid particles, wherein the state information records whether the fluid particles are located above or under a fluid surface and the interactions between the fluid particles and a terrain or a plurality of dynamic objects, and the step of providing the state information of the fluid particles comprises:
rendering a height field of the terrain and the dynamic objects in the region of the fluid particles;
calculating a gradient value at each position in the terrain and the dynamic objects by using the height field and serving the gradient value as the flow direction of the fluid particles along the terrain or the dynamic objects, and recording the gradient values as a gradient field;
adding a predetermined velocity field to the gradient field to obtain a flow field of the fluid particles; and
determining a state transition situation when the fluid particles interact with the terrain or the dynamic objects by using a finite state machine according to state information of the fluid particles and the information of the height field and the flow field, and recording the state transition situation as the state information of the fluid particles;
determining whether to render the fluid particles in a direction facing a viewer or in a direction parallel to the flow direction according to the information that whether the fluid particles are located above or under the fluid surface; and
rendering the fluid particles as a plurality of two-dimensional metaballs according to the interactions between the fluid particles and the terrain or the dynamic objects and stacking the metaballs to reconstruct the fluid.

2. The fluid rendering method according to claim 1, wherein the step of providing the state information of the fluid particles further comprises:
storing the state information, the height field, the gradient field, and the flow field as a texture to be accessed by a graphic processing unit (GPU).

3. The fluid rendering method according to claim 1, wherein the state information comprises position, velocity, state, and transition of the fluid particles.

4. The fluid rendering method according to claim 1, wherein after the step of calculating the gradient field of the terrain or the dynamic objects by using the height field, the fluid rendering method further comprises:
performing a Gaussian blur process to the gradient field.

5. The fluid rendering method according to claim 4, wherein after the step of performing the Gaussian blur process to the gradient field, the fluid rendering method further comprises:
deleting the gradient values lower than a threshold in the processed gradient field.

6. The fluid rendering method according to claim 1, further comprising:
rendering a lighting effect of the fluid particles according to a relationship between the positions of the fluid particles and the gradient field.

7. The fluid rendering method according to claim 6, wherein the lighting effect comprises the reflection, refraction, and Fresnel effect of a light.

8. The fluid rendering method according to claim 1, wherein the step of rendering the height field of the terrain or the dynamic objects in the region of the fluid particles comprises:
rendering the height field at an angle perpendicular to the ground, wherein a pixel value at each position of the height field is corresponding to a height of the terrain or the dynamic objects.

9. The fluid rendering method according to claim 1, wherein the terrain comprises one of the earth surface and the surface of a river.

10. The fluid rendering method according to claim 1, wherein the state transition situation comprises that whether the fluid particles are located above or under the fluid surface, collisions between the fluid particles and the terrain or the dynamic objects, and the situation that the fluid particles are broken into a plurality of sub-fluid particles due to the collisions.

11. The fluid rendering method according to claim 1, wherein the step of determining whether to render the fluid particles in the direction facing the viewer or in the direction parallel to the flow direction according to the information that whether the fluid particles are located above or under the fluid surface is to render the fluid particles by using a billboard, wherein the fluid particles are rendered in the direction facing the viewer when the fluid particles are located above the fluid surface; and the fluid particles are rendered in the direction parallel to the flow direction when the fluid particles are located under the fluid surface.

12. The fluid rendering method according to claim 1, wherein the fluid particles are rendered as the two-dimensional metaballs through a point splatting method.

13. The fluid rendering method according to claim 1, wherein the step of rendering the fluid particles as the metaballs comprises:

rendering the metaballs by using multilayer textures so as to simulate the thickness and depth of the fluid particles.

14. The fluid rendering method according to claim 1, further comprising:

adding a background to a back layer of the rendered fluid particles.

* * * * *